United States Patent [19]

Crépin

[11] Patent Number: 4,500,302
[45] Date of Patent: Feb. 19, 1985

[54] DERAILLER FOR A CYCLE HAVING AN ORIENTABLE CHAIN GUIDING DEVICE

[75] Inventor: Hervé Crépin, Noyelles sur Mer, France

[73] Assignee: Huret et ses Fils, Nanterre, France

[21] Appl. No.: 539,176

[22] Filed: Oct. 5, 1983

[30] Foreign Application Priority Data

Oct. 12, 1982 [FR] France .................. 82 17081

[51] Int. Cl.³ .................................. F16H 7/22
[52] U.S. Cl. ......................................... 474/82
[58] Field of Search ........................ 474/82, 78–81

[56] References Cited

U.S. PATENT DOCUMENTS

| | | | |
|---|---|---|---|
| 3,798,988 | 3/1974 | Nagano | 474/80 X |
| 4,061,048 | 12/1977 | Huret et al. | 474/82 |
| 4,185,510 | 1/1980 | Juy | 474/82 |

FOREIGN PATENT DOCUMENTS

| | | | |
|---|---|---|---|
| 902980 | 9/1945 | France . | |
| 64341 | 11/1955 | France . | |
| 1271896 | of 1961 | France | 474/82 |
| 2337657 | 5/1977 | France . | |

Primary Examiner—James A. Leppink
Assistant Examiner—Thuy M. Bui
Attorney, Agent, or Firm—Trexler, Bushnell & Wolters, Ltd.

[57] ABSTRACT

The derailler comprises a support 4 for a chain guiding device 12, 13 which is connected to the support by a deformable articulation structure which, under the action of a pulling cable, positions the chain guiding device relative to the free-wheel sprockets. The deformable articulation structure comprises a deformable quadrilateral structure 6, 7 to 11, at least two sides of which quadrilateral structure are unequal.

5 Claims, 4 Drawing Figures

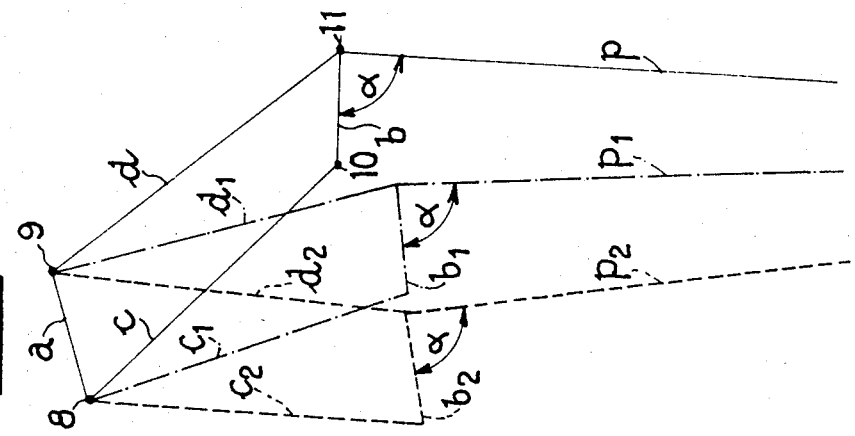
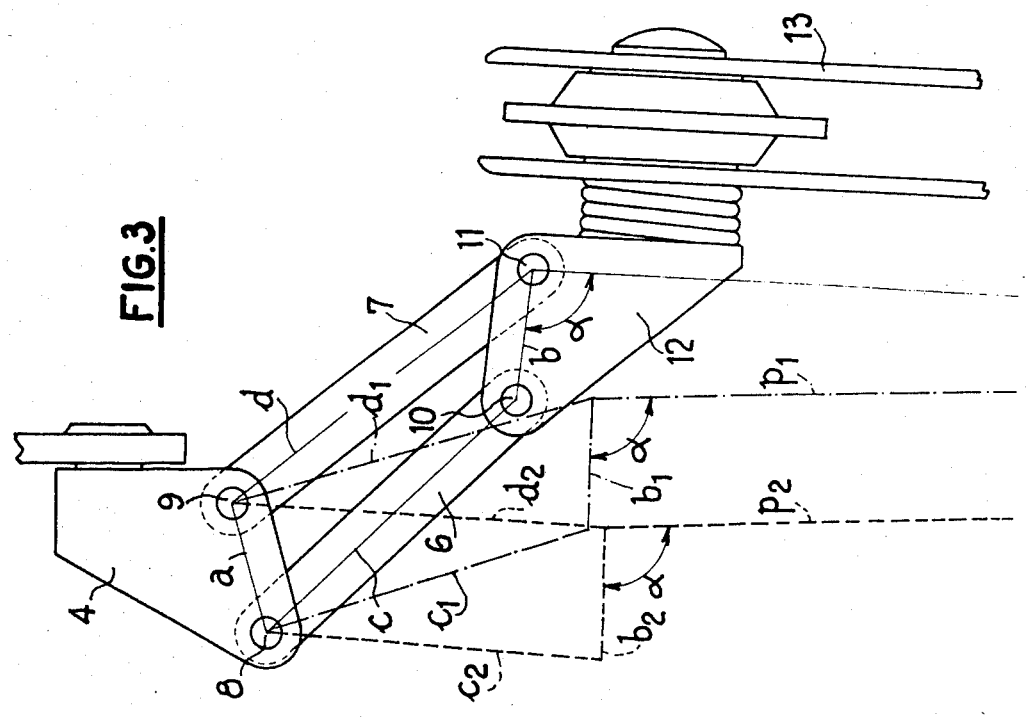

DERAILLER FOR A CYCLE HAVING AN ORIENTABLE CHAIN GUIDING DEVICE

The present invention relates to a derailleur for a cycle of the type comprising a support for a chain guiding device which is connected to the support by a deformable articulation structure which, under the action of a pulling cable, positions the chain guiding device relative to the sprockets of the free-wheel.

In known derailleurs of the aforementioned type, the deformable articulation structure for mounting the guiding device on the support is formed by a deformable parallelogram structure whose two opposed sides are defined, for example, by equally spaced apart articulation points provided on the support and on the chain guiding device, these articulation points being interconnected in pairs by links of equal length.

It will be understood that the chain guiding device which is connected in this way to its support by a deformable parallelogram structure whose articulation points on the support are fixed, remains parallel to itself as it is moved for positioning the chain with respect to the sprockets of the free-wheel.

Now, in respect of a bicycle provided with a free-wheel having for example six sprockets and a double chain wheel, there are large angular offsets of the chain between the end positions it may occupy on the sprockets of the free-wheel and on the chain-wheels of the pedal crank in accordance with the speed ratio selected by the user.

As the chain guiding device of the derailleur remains parallel to itself, in the aforementioned end positions of the chain, the latter makes with the plane of the guide rollers and with the walls of the fork element of the chain guiding device such an angle that the rollers operate under bad conditions and there is a risk of the chain rubbing along the walls of the fork element of the chain guiding device.

An object of the invention is to overcome the aforementioned drawbacks of the known deralleurs and to provide a derailleur for a cycle whose chain guiding device is always substantially parallel to the direction of the chain irrespective of the selected transmission ratio.

The invention therefore provides a derailleur for a cycle comprising a support for a chain guiding device which is connected to the support by a deformable articulation structure which, under the action of a pulling cable, ensures the positioning of the chain guiding device with respect to the free-wheel sprockets, wherein the deformable articulation structure comprises a deformable quadrilateral structure at least two sides of which structure are unequal.

Further features and advantages of the invention will be apparent from the following description which is given solely by way of example with reference to the accompagnying drawings, in which:

FIG. 3 is a view similar to FIG. 2 of a modification of the derailleur according to the invention, and FIG. 4 is a diagram of another modification of the articulation structure of the derailleur according to the invention.

Figure 1:
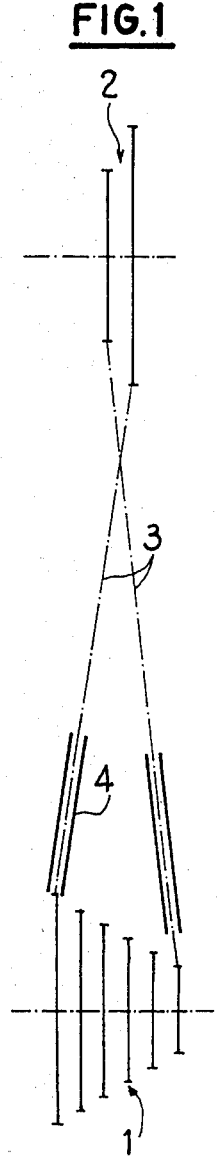
FIG. 1 is a diagrammatic view of a transmission unit for a cycle comprising a free-wheel having six sprockets and a double chain-wheel and showing the end angular positions of the chain guiding device obtained with the derailleur according to the invention.

FIG. 1 shows a transmission unit for a cycle comprising a free-wheel 1 having six sprockets and a double chain-wheel 2 connected by a chain the end positions of which, depending on the chosen gear ratios, are represented by the dot-dash lines 3. This Figure shows that the angular offset between the end positions of the chain is of such size that, in order to ensure that the chain pass through the chain guiding device of the derailleur under good conditions, the orientation of the chain guiding device (shown diagrammatically at 4 in FIG. 1) must be modified in accordance with the direction of the chain which is determined by choice of the transmission ratio.

Figure 2:
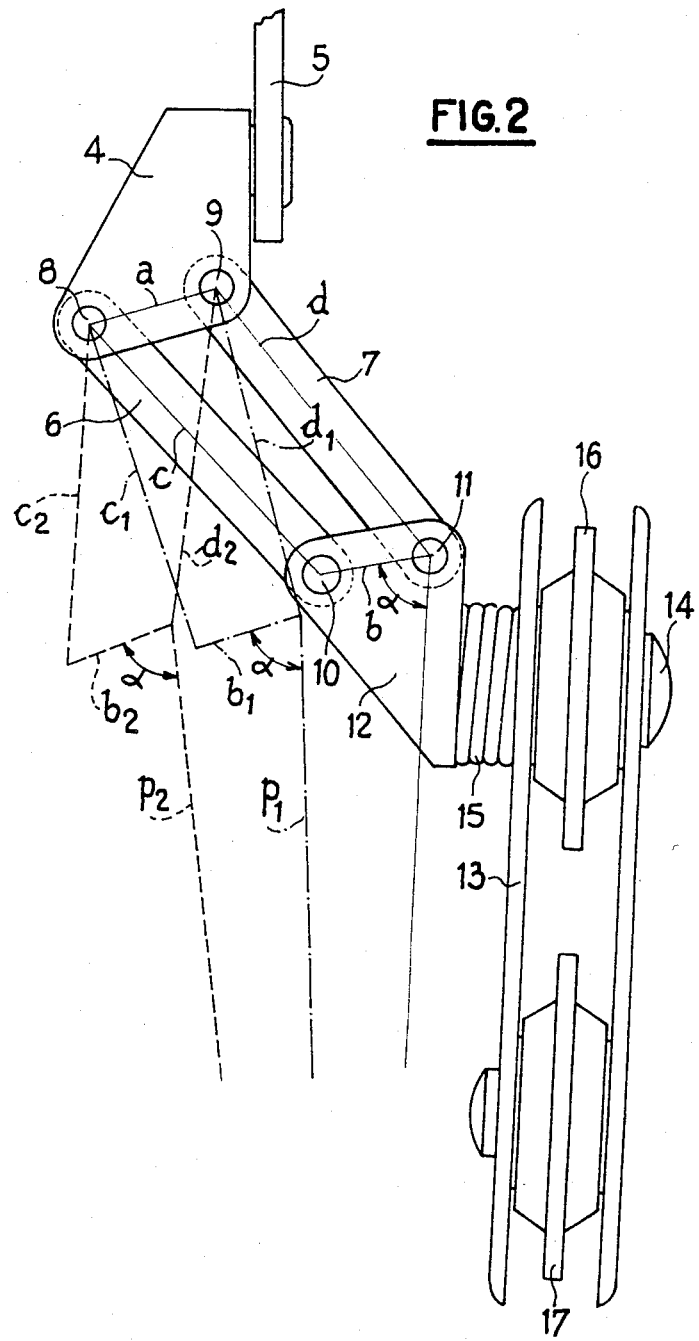
FIG. 2 is a diagrammatic plan view of the derailleur according to the invention.

This modification is achieved in the derailleur shown diagrammatically in FIG. 2 which comprises a support 4 adapted to be fixed to the rear fork 5 of the frame of a bicycle. Pivotally mounted on the support 4 are two links 6 and 7, the pivotal mounting being formed by respective pivot pins 8, 9 located at a distance a from each other.

At their opposite ends, the links 6 and 7 are pivotally mounted by respective pivot pins 10 and 11 spaced a distance b apart and mounted in a member 12 which acts as a support for a fork element 13 fixed to the member 12 by a stud 14 with the provision of a spring 15 for biasing the fork element 13 rearwardly of the derailleur, this spring surrounding the stud 14 and being interposed between the member 12 and the fork element 13.

Rotatively mounted in the fork element 13 are a chain guide roller 16 and a chain tensioning roller 17. The links 6 and 7 for pivotally mounting the member 12 on the support 4 have lengths c and d which are equal in the presently-described embodiment.

Further, the distance b between the pins 10 and 11 mounted in the member 12 is less than the distance a between the pins 8 and 9 mounted in the support 4.

The direction in which the fork element 13 extends makes with the straight line through the pivot pins 10 and 11 mounted in the member 12 a constant angle α. The lengths a, b, c and d of the sides of the deformable quadrilateral pivotally mounting the chain guiding device on the support 4 are so chosen that, for the various positions of the deformable quadrilateral respectively corresponding to the positioning of the chain guiding device relative to the respective sprockets of the free-wheel, the direction in which the fork element 13 extends is substantially parallel to the direction in which the lower portion of the chain extends.

FIG. 2 shows in dot-dash lines the intermediate position of the quadrilateral structure a, b, c, d, the sides $b_1$, $c_1$, $d_1$ of which have turned relative to the side a rigid with the support 4 and in respect of which a straight line $p_1$ drawn from the top of the quadrilateral structure corresponding to the pivot point 11 and making an angle with the side $b_1$, materialises the new direction of the fork element 13 in this position. The end position opposed to the position of the quadrilateral structure a, b, c, d, is shown in dot-dash lines by the quadrilateral structure a, $b_2$, $c_2$, $d_2$, extended by a straight line $p_2$ which materialises the direction of the fork element 13 in this last-mentioned position.

Thus it can be seen that the fork element 13 of the chain guiding device, instead of remaining parallel to itself as in the chain guiding devices of the prior art when it is shifted for positioning it with respect to the various free-wheel sprockets, has its direction varied in such manner that the fork element is always substantially parallel to the direction in which the chain extends between the free-wheel sprockets and the chainwheel which have been selected for the desired transmission ratio. This appropriate variation in the direction in which the chain guiding fork element 13 extends, is achieved by a judicious choice of the values of the distances a to d defined by the quadrilateral structure pivotally mounting the fork element 13 on the support 4.

For example, the sides a, b, c, d, may be given the following values:

a = 15.5 mm
b = 14.5 mm
c = d = 40 mm

FIG. 3 shows a derailleur similar to that of FIG. 2, except that in the second embodiment the distance a between the pivot pins 8 and 9 mounting the links 6 and 7 on the support 4 is equal to the distance b between the pivot pins mounting these links on the member 12 carrying the fork element 13, while the lengths c and d of the links 6 and 7 are different. In the presently-described embodiment, the length d of the link 7 exceeds the length c of the link 6.

FIG. 4 shows a second modification of the arrangement according to the invention in which the quadrilateral structure defined by the pivot points 8, 9, 10 and 11 of the links 6 and 7 connecting the support member 12 of the fork element to the support 4 of the derailleur is constituted by the sides a, b, c and d each of which has a different length. Owing to a judicious choice of the lengths of the sides a, b, c, and d, a quadrilateral structure is obtained whose deformations result in respect of their extension p which materialises the direction in which the chain guiding fork element extends, in an angular variation which corresponds to the angular variation of the direction in which the chain extends for the various selected transmission ratios, the chain guiding fork element 13 always remaining substantially parallel to the chain so that the latter passes around the rollers 16 and 17 under optimal conditions, which reduces friction and wear of the rollers' and the chain guiding fork element.

The derailleur therefore operates in a considerably improved manner.

What is claimed is:

1. A derailleur for a cycle having free-wheel sprockets, the derailleur comprising a fixed support, a chain guiding device, a deformable articulation structure pivotally connecting the chain guiding device to the support and for connection to a control cable for positioning the chain guiding device relative to the free-wheel sprockets, the deformable articulation structure comprising a deformable quadrilateral structure having at least two sides which are of unequal lengths.

2. A derailleur according to claim 1, wherein the deformable quadrilateral structure comprises two links which have first end portions pivotally mounted at two first points on the fixed support and second end portions, a chain guiding fork element mounted on said member, said second end portions of the two links being pivotally mounted on said member at two second points, the quadrilateral structure having sides respectively defined by a distance between said first pivot points, a distance between said second pivot points and lengths between said end portions of the two links, at least two sides of the quadrilateral structure being unequal.

3. A derailleur according to claim 2, wherein the sides of the quadrilateral structure defined by the distance between said first pivot points and the distance between said second pivot points have different lengths and the lengths between said end portions of the links are equal.

4. A derailleur according to claim 2, wherein the sides of the quadrilateral structure defined by the distance between said first pivot points and the distance between said second points are equal and the lengths between said end portions of the links are different.

5. A derailleur according to claim 2, wherein the sides of the deformable quadrilateral structure are all of different lengths.

* * * * *